United States Patent [19]

Beard

[11] Patent Number: 4,661,183

[45] Date of Patent: Apr. 28, 1987

[54] METHOD FOR MAKING AND APPLYING ROTOR BANDS

[75] Inventor: Dennis J. Beard, Xenia, Ohio

[73] Assignee: Vernay Laboratories, Inc., Yellow Springs, Ohio

[21] Appl. No.: 790,024

[22] Filed: Oct. 22, 1985

[51] Int. Cl.[4] .......................................... B65H 81/00
[52] U.S. Cl. ..................... 156/172; 29/598; 310/271
[58] Field of Search ............... 156/169, 172, 173, 175, 156/180, 294; 29/598; 310/271, 270

[56] References Cited

U.S. PATENT DOCUMENTS

| | | |
|---|---|---|
| 391,270 | 10/1888 | Pfannkuche . |
| 876,949 | 1/1908 | Dickerson . |
| 894,533 | 7/1908 | Reist . |
| 1,124,456 | 1/1915 | Kennedy et al. . |
| 1,723,409 | 8/1929 | Cogneau . |
| 2,593,105 | 4/1952 | Compton, Jr. . |
| 2,749,266 | 6/1956 | Eldred ................................ 156/173 |
| 2,896,100 | 7/1959 | Axelson . |
| 2,949,555 | 8/1960 | Paul . |
| 3,047,756 | 7/1962 | Coggeshall ........................ 310/271 |
| 4,198,878 | 4/1980 | Lewis et al. . |
| 4,207,778 | 6/1980 | Hatch . |
| 4,317,693 | 3/1982 | Reed .................................. 156/175 |

Primary Examiner—Michael Ball
Attorney, Agent, or Firm—Biebel, French & Nauman

[57] ABSTRACT

A method for forming annular bands to be used on rotors of electrodynamic machines for retaining windings on the rotors against centrifugal forces generated by rotation comprises winding a continuous single strand, ideally a single filament, of resinated reinforcing material onto a mandrel to form at least one, substantially continuous layer of the resinated reinforcing material along the mandrel, which layer of reinforcing material is cured to form a solidified cylindrical body, removed from the mandrel and circumferentially cut to form the annular bands. The annular bands are then pressed onto the rotor of an electrodynamic machine, with the resulting banded portions of the rotor preferably being resinated and cured to secure the bands to the rotor.

6 Claims, 8 Drawing Figures

METHOD FOR MAKING AND APPLYING ROTOR BANDS

BACKGROUND OF THE INVENTION

The present invention relates generally to banding rotors of electrodynamic machines and, more particularly, to improved rotor bands and a method for making and applying such bands.

The construction of rotors for electrodynamic machines is well known. For example, armatures for use in electric generators or motors comprise shafts on which laminations of magnetic materials are mounted and fixed together to form armature cores. Windings of the armatures are placed into slots formed in the armature cores and include end turns or loops which extend beyond the ends of the slots. On such rotors, measures must be taken to resist the centrifugal forces to which the windings are subjected in the open slots, and particularly, at their ends beyond the slots of the armature core where the windings are connected. Steel bands or wire have been used for this purpose to encircle various portions of the armature cores and the end portions of the windings.

While such metallic bands perform the winding retaining function, they also present several undesirable characteristics. For example, extreme care must be taken during installation of such bands to ensure that the bands do not cut into the winding insulation, particularly at the end portions of the windings where the bands lay directly over the windings. If such metallic bands cut into the winding insulation due to sharp edges, working loose or otherwise, the machine will fail.

An improvement in rotor banding was brought about by tightly wrapping under tension resin impregnated roves or webbing comprising fibers of glass, nylon, polyester or the like around an armature and curing the resulting wrappings to form a unitary band around the rotor. While such rotor banding provides an improvement over the metallic bands, this process presents its own undesirable characteristics which include the mess of handling the resin impregnated roves or webbing and the added time required for forming and curing the bands during the rotor manufacturing process. Additionally, since roves or webbing are used to form the bands, the individual fibers of the roves or webbing are oriented at varying angular orientations relative to the axis of the rotor. These varying orientations of the fibers reduce the strength of the resulting band which is maximized if all fibers are oriented as near to 90° to the axis of the rotor as possible.

Accordingly, the need exists for an effective, maximum strength rotor band which can be quickly and conveniently installed during manufacture of the rotor without the mess and the additional time required to install the bands formed by winding and curing resin impregnated roves or webbing directly on the rotor.

SUMMARY OF THE INVENTION

The problems associated with the prior art metallic bands and the wet wrapping of resin impregnated roves or webbing about a rotor are overcome by the present invention wherein annular bands for banding rotors of electrodynamic machines each comprise a section of a cylinder which is formed as a closed cylindrical helix from cured resinated reinforcing material and preferably wound from a single strand ideally formed as a single continuous filament, with all windings of the strand being parallel to one another and as near as possible to 90° relative to the axis of the cylinder. The cylinder is initially formed and then cut into a plurality of bands which are then pressed onto a rotor, the axial lengths of the cylindrical sections or widths of the bands corresponding to the rotors to be banded. Since the annular bands of the present invention are not electrically conducting and are also less apt to damage the windings as they are pressed onto rotors, much less care is required during installation of the bands.

In accordance with one aspect of the present invention, a method for forming annular bands to be used on rotors of electrodynamic machines for retaining windings on the rotors against centrifugal forces generated by rotation comprises the steps of: providing a source of reinforcing material in continuous single strand form; resinating the reinforcing material; evenly winding the resinated reinforcing material onto a mandrel to form a single, substantially continuous layer of resinated reinforcing material along the mandrel; curing the resinated reinforcing material on the mandrel to form a solidified cylindrical body; removing the cylindrical body from the mandrel; and, circumferentially cutting the cylindrical body to form the annular bands.

The reinforcing material is formed as a closed helix along the mandrel by either moving the mandrel or the source of reinforcing material by approximately the width of a single strand of the reinforcing material for each revolution of the mandrel or rotation of the reinforcing material about the mandrel. In this way, adjacent windings of the continuous strand of reinforcing material are substantially in contact with one another and oriented parallel to one another, with the angle of the strand of reinforcing material relative to the axis of the mandrel being very near to 90°. Accordingly, the reinforcing material is oriented to rely on its strong tensile strength such that annular bands cut from the cylindrical body are very strong and, in fact, may exceed equivalently sized steel bands.

If added strength is required, at least one additional, substantially continuous layer of the resinated reinforcing material may be wound onto the mandrel before the material is cured. While winding one or more closed helical layers of a single strand of resinated reinforcing material is preferred to form the maximum strength bands in accordance with the present invention, it will be apparent that bands suitable for certain applications can be formed by simultaneously winding two or more strands of resinated reinforcing material.

In addition to the steps recited for forming annular bands in accordance with the present invention, another aspect of the present invention defines a method for banding rotors comprising the further step of pressing the annular bands onto the rotors. Here again, single layered bands, multiple layered bands, or bands formed by simultaneously winding two or more strands of resinated reinforcing material, may be used. Preferably, in the method for banding rotors, the portion or portions of the rotors including annular bands are resinated and the rotors are then cured to secure the annular bands to the rotors.

It is, therefore, a primary object of the present invention to provide a method for forming improved annular rotor bands from resinated reinforcing material in continuous strand form by winding the material in a closed helix about a mandrel, curing the resinated reinforcing material to form a solidified cylindrical body which is then removed from the mandrel and circumferentially cut to form the annular bands.

It is another object of the present invention to provide a method for banding rotors with rotor bands formed by winding resinated reinforcing material in a closed helical form about a mandrel, curing the resinated reinforcing material to form a solidified cylinder which is then removed from the mandrel and circumferentially cut to form the rotor bands which are then pressed onto the rotors.

It is an additional object of the present invention to provide a preformed annular band comprising a section of a cylinder formed as a closed cylindrical helix from cured resinated reinforcing material, with the length of the section corresponding to a rotor to be banded.

Other objects and advantages of the invention will be apparent from the following description, the accompanying drawings and the appended claims.

DETAILED DESCRIPTION OF THE INVENTION

Figure 1:
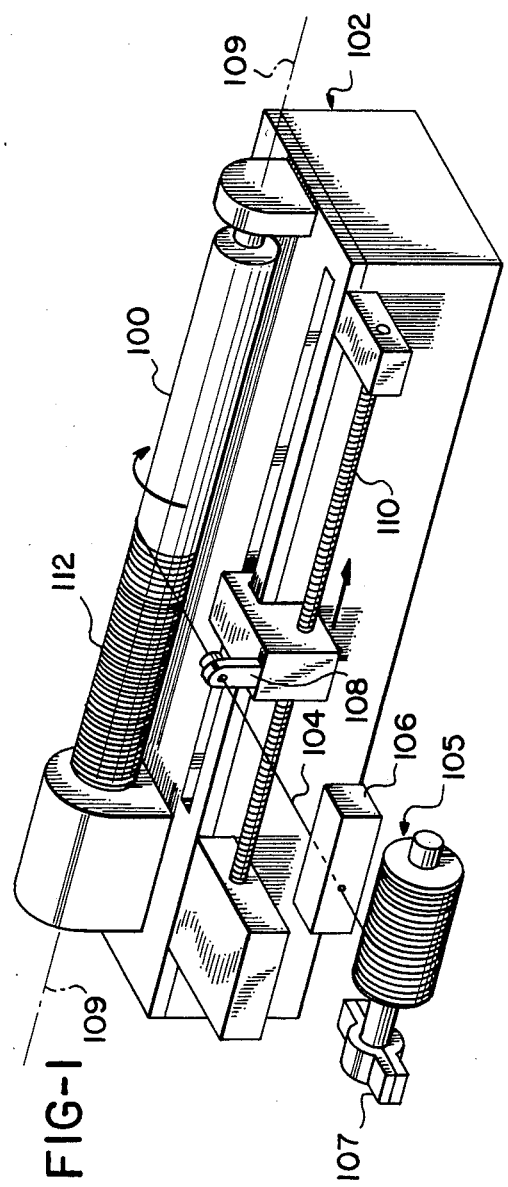
FIG. 1 is a schematic perspective view of apparatus for performing the strand winding step in accordance with the method aspects of the present invention.
Figure 2:
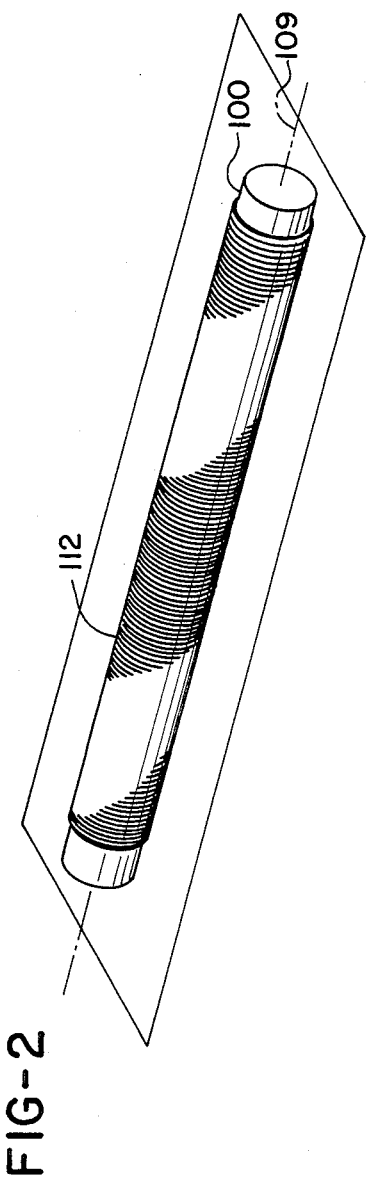
FIG. 2 shows the curing of resinated reinforcing material wound in a closed helical form upon a mandrel to form a solidified cylindrical body.
Figure 3:
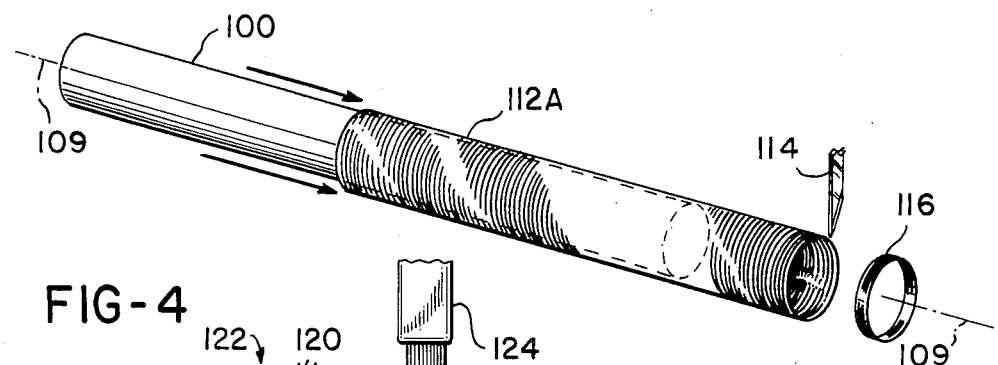
FIG. 3 shows the removal of the solidified cylindrical body from the mandrel and cutting of an individual annular band from the cylindrical body.

FIGS. 1-3 schematically illustrate the method of making improved rotor bands in accordance with the present invention for banding rotors of electrodynamic machines to prevent damage to the rotors from centrifugal forces generated by rotation of the rotors. A mandrel 100 is mounted on a winding machine 102, a lathe or the like, such that it can be rotated for winding or wrapping one or more layers of resinated reinforcing material, such as fiberglass, nylon, polyester or the like. The reinforcing material is provided preferably as a continuous single strand 104 and ideally as a single filament.

A source of such reinforcing material is shown schematically as a spool 105 of the reinforcing material in continuous strand form. The source of reinforcing material is saturated or impregnated with a resin material which may be thermally or otherwise cured. The reinforcing material may be preresinated on the spool 105, may be drawn through a bath 106 of resin or may be otherwise impregnated by resin prior to being wound on the mandrel 100 as will be apparent to those familiar with using such materials. In the preferred embodiment of the present invention, only a single source or spool 105 of reinforcing material in continuous strand form is provided as shown in FIG. 1; however, additional sources of reinforcing material can be provided such that the mandrel 100 is simultaneously wrapped by two or more strands of resinated reinforcing material.

The single strand 104 of resinated reinforcing material is drawn from the spool 105, which is preferably held against free rotation by a clamp 107 or otherwise to place the strand 104 under tension as it is wound onto the mandrel 100. The strand 104 of reinforcing material from the spool 105 passes through a guide 108 and is advanced axially along the mandrel 100 as the mandrel 100 is rotated. The guide 108 is positioned relative to the mandrel 100 such that the angle of the strand 104 of reinforcing material is very near to 90° to the axis 109 of the mandrel 100 as the reinforcing material is wound thereonto. Accordingly, the reinforcing material is oriented to rely on its strong tensile strength such that the annular bands ultimately formed therefrom have exceptional strength and may exceed equivalent steel bands.

The guide 108 is advanced along a screw thread 110 in synchronism with the rotation of the mandrel 100 such that the single strand 104 of reinforcing material from the spool 105 is advanced by approximately the width of the single strand 104 for each revolution of the mandrel 100. In this way, adjacent windings of the continuous strand 104 of reinforcing material are substantially in contact with one another and the windings, as they are wound around the mandrel, are oriented parallel to one another to form a substantially continuous layer of the resinated reinforcing material.

Figure 6:
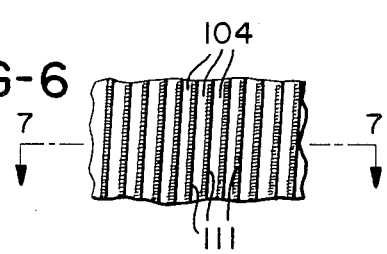
FIG. 6 shows a small section of a preformed annular band in accordance with the present invention to illustrate the substantially parallel arrangement and contact between adjacent windings of the strand forming the band.
Figure 7:
FIG. 7 is a cross-sectional view on an enlarged scale taken along the section line 7—7 of FIG. 6.

This formation of the reinforcing material on the mandrel 100 is referred to herein as a closed helical or closed helix form. The parallel alignment and close proximity of adjacent windings of the continuous strand 104 of reinforcing material and the cured resin 111 is best shown in FIG. 6, which shows a small section of an annular band, and FIG. 7, which is a sectional view taken along the section line 7—7 of FIG. 6. In this way, a substantially continuous layer 112 of resinated reinforcing material is wound onto the mandrel 100 as shown in FIG. 1.

The mandrel 100 together with the substantially continuous layer 112 of resinated reinforcing material is removed from the winding machine 102 and cured by subjecting the coated mandrel to the appropriate thermal or other curing conditions as indicated in FIG. 2. Once cured, the continuous layer 112 of resinated reinforcing material forms a solidified cylindrical body 112A.

The solidified cylindrical body 112A is then forced or pressed from the mandrel 100 as shown schematically in FIG. 3. The mandrel 100 can be rotated such that the solidified cylindrical body 112A is engaged by a cutting blade 114 to circumferentially cut the cylindrical body 112A into a plurality of annular bands, one of which comprises a band 116 as shown in FIG. 3. It will be apparent that the solidified cylindrical body 112A can be circumferentially cut as the body 112A is removed from the mandrel 100 or the body 112A may be completely removed from the mandrel 100 and subsequently cut or subdivided into a plurality of bands 116. The solidified cylindrical body 112A can also be cut on the mandrel 100; however, care must be taken to ensure that the mandrel 100 is not damaged such that it may again be used to form another solid cylindrical body 112A for the formation of additional bands 116.

Figure 4:
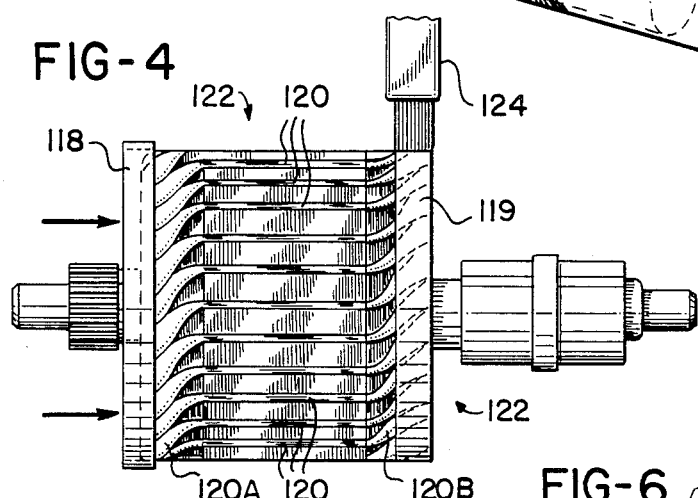
FIG. 4 shows a preformed annular band in accordance with one aspect of the present invention being pressed onto the end portions of the windings of an armature.

FIG. 4 shows a first preformed annular band 118, formed in accordance with the present invention as illustrated in FIGS. 1-3 and previously described, being pressed onto the end portions 120A of the windings 120 of an armature 122 which is formed in a well known manner. A second annular band 119 is shown in position on the end portions 120B of the windings 120 at the opposite end of the armature 122. Preferably, the portion or portions of the rotor, which includes the annular band or bands, are resinated, for example, by means of a brush 124 or a resin spraying or dipping operation, which deposits resin onto that portion or portions of the rotor, and the rotor is then cured to secure the annular band or bands to the rotor.

Figure 5:
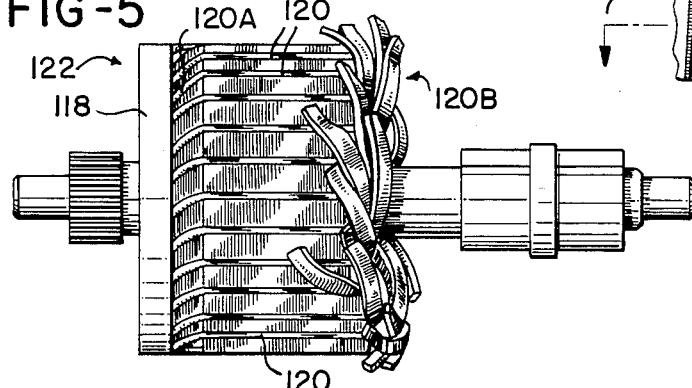
FIG. 5 shows an armature having a preformed annular band in accordance with the present invention pressed onto the winding ends at one end of an armature and destroyed winding ends at the opposite end of the armature.

The annular band 118 is pressed fully onto the end portions 120A of the windings 120 prior to operation of the armature 122 in a motor or generator. FIG. 5 illustrates an armature 122 which was operated with the annular band 118 of the present invention on the end portions 120A of the windings 120, but with a similar sized steel band on the end portions 120B of the windings 120. As shown, the band 118 protected the end portions 120A of the windings 120, but the steel band failed resulting in the destruction of the end portions 120B of the windings 120 due to the centrifugal forces which were exerted on the windings as the armature 122 was rotated.

Figure 8:
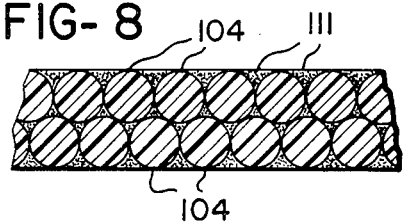
FIG. 8 is a cross-sectional view of a band formed of two closed helical windings of resinated reinforcing material.

Annular bands formed in accordance with the preferred embodiment of the present invention as a single layer of resinated reinforcing material are very strong and, in fact, may exceed equivalently sized steel bands as previously noted. If added strength is required, at least one additional, substantially continuous layer of the resinated reinforcing material may be wound onto the mandrel before the material is cured. FIG. 8 illustrates a cross-sectional view taken through a two-layered annular band formed in accordance with the the present invention.

Alternately, annular bands may be formed in accordance with the present invention by winding multiple strands of resinated reinforcing material onto a mandrel at the same time to thus form a multiple strand annular band, but of less regular structure than the two-layered annular band illustrated in cross-section in FIG. 8. While such multiple strand bands are suitable for certain applications, the orientation of the strands tends to deviate from the ideal 90° orientation, and hence, the bands are not as strong as bands formed in accordance with the single or multiple layered preferred embodiments of the present invention.

While the rotor bands and the methods for making and applying the bands to rotors of an electrodynamic machine constitute preferred embodiments of this invention, it is to be understood that the invention is not limited to these precise forms of rotor bands and methods, and that changes may be made in either without departing from the scope of the invention, which is defined in the appended claims.

What is claimed is:

1. A method for banding rotors of electrodynamic machines for retaining windings on said rotors against centrifugal forces generated by rotation of said rotors, said method comprising the steps of:

providing a source of reinforcing material in continuous strand form;

resinating said reinforcing material;

evenly winding said resinated reinforcing material onto a mandrel to form a single, substantially continuous layer of said resinated reinforcing material onto said mandrel;

curing said resinated reinforcing material to form a solidified cylindrical body on said mandrel;

circumferentially cutting said cylindrical body to form annular bands having a width corresponding to said rotors; and pressing said annular bands onto said rotors.

2. A method for banding rotors as claimed in claim 1 further comprising the steps of:

resinating at least a portion of said rotors including said annular bands; and curing said resinated rotors to secure said annular bands to said rotors.

3. A method for banding rotors as claimed in claim 1 further comprising the step of evenly winding at least one additional, substantially continuous layer of said resinated reinforcing material onto said mandrel before performing the curing step.

4. A method for banding rotors as claimed in claim 3 further comprising the steps of:

resinating at least a portion of said rotors including said annular bands; and curing said resinated rotors to secure said annular bands to said rotors.

5. A method for banding a rotor of an electrodynamic machine to retain windings on said rotor against centrifugal forces generated by rotation of said rotor, said method comprising pressing a cured annular band onto the rotor, said annular band comprising a section of a cylinder formed as a closed cylindrical helix from a single layer of cured resinated reinforcing material, the length of said section corresponding to said rotor.

6. The method of claim 5 wherein said annular band further comprising at least one additional, substantially continuous layer of cured resinated reinforcing material.

* * * * *